(12) United States Patent
Crawshaw et al.

(10) Patent No.: US 7,013,995 B2
(45) Date of Patent: Mar. 21, 2006

(54) COMPOSITIONS AND PROCESSES FOR TREATING SUBTERRANEAN FORMATIONS

(75) Inventors: John Peter Crawshaw, Newmarket (GB); Paul William Way, Hauxton (GB); Marc Thiercelin, Ville d'Avray (FR)

(73) Assignee: Schlumberger Technology Corporation, Ridgefield, CT (US)

( * ) Notice: Subject to any disclaimer, the term of this patent is extended or adjusted under 35 U.S.C. 154(b) by 284 days.

(21) Appl. No.: 10/297,776

(22) PCT Filed: Jun. 11, 2001

(86) PCT No.: PCT/GB01/02569

§ 371 (c)(1),
(2), (4) Date: Jun. 16, 2003

(87) PCT Pub. No.: WO01/98627

PCT Pub. Date: Dec. 27, 2001

(65) Prior Publication Data

US 2004/0016543 A1    Jan. 29, 2004

(30) Foreign Application Priority Data

Jun. 21, 2000    (GB) .................................. 00150557

(51) Int. Cl.
*E21B 7/00*    (2006.01)
(52) U.S. Cl. ............................ 175/64; 175/65; 175/72; 166/294; 166/300
(58) Field of Classification Search ................ 166/270, 166/300; 175/65, 72, 64
See application file for complete search history.

(56) References Cited

U.S. PATENT DOCUMENTS 3,766,984 A * 10/1973 Nimerick .................... 166/294
3,941,191 A    3/1976 Pusch
4,137,971 A    2/1979 Shaughnessy et al.
4,649,998 A    3/1987 Friedman
4,703,800 A    11/1987 Hanna
4,715,746 A    12/1987 Mann et al.
4,761,099 A    8/1988 Mann et al.
4,784,223 A    11/1988 Worrall et al.
4,965,292 A    10/1990 Müller et al.
5,159,980 A    11/1992 Onan et al.
5,201,612 A    4/1993 Gadelle et al.
5,242,021 A    9/1993 Gadelle et al.
5,911,282 A *  6/1999 Onan et al. .................... 175/72
6,012,524 A    1/2000 Chatterji et al.

FOREIGN PATENT DOCUMENTS

| EP | 0 229 425 A2 | 7/1987 |
|---|---|---|
| GB | 2 091 784 A | 8/1982 |
| GB | 2 221 483 A | 2/1990 |
| RU | 2032067 C1 | 3/1995 |
| WO | 99/31353 A1 | 6/1999 |

* cited by examiner

Primary Examiner—Brian E. Glessner
Assistant Examiner—Bryan Fuller
(74) Attorney, Agent, or Firm—Jody Lynn DeStefanis; William L. Wang; Dale Gaudier

(57) ABSTRACT

A method and materials for stabilizing a wellbore against excess fluid pressure is described. It comprises forming or placing a flexible and essentially impermeable lining on or in the wellbore wall. The flexibility of the lining ensures that it remains in compression as the pressure in the wellbore is increased above the fluid pressure in the surrounding rock and it therefore does not need high tensile strength. The lining may be a preformed elastomer sleeve or formed in situ by the use of a reactive drilling fluid. Appropriate reactive formulations are described for the situation where the rock contains significant quantities of clay.

8 Claims, 2 Drawing Sheets

COMPOSITIONS AND PROCESSES FOR TREATING SUBTERRANEAN FORMATIONS

This invention relates to compositions and methods for stabilizing subterranean formations surrounding a borehole. More specifically, it pertains to additives for drilling and remedial fluids or other materials and methods used to improve the mechanical properties of the wall of the borehole.

BACKGROUND OF THE INVENTION

Drilling operations typically involve mounting a drill bit on the lower end of a drill pipe or "drill stem" and rotating the drill bit against the bottom of a hole to penetrate a formation, creating a borehole. A drilling fluid, typically referred to as "drilling mud", may be circulated down through the drill pipe, out the drill bit, and back up to the surface through the annulus between the drill pipe and the borehole wall. The drilling fluid has a number of purposes, including cooling and lubricating the bit, carrying the cuttings from the hole to the surface, and exerting a hydrostatic pressure against the borehole wall to prevent the flow of fluids from the surrounding formation into the borehole.

A drilling fluid can place undesirable mechanical stress on the rock around the wellbore and may even damage the reservoir. With increasing depth a hydrostatic pressure acts outward on the borehole, which may cause mechanical damage to the formation and reduce the ability of the well to produce oil or gas. Drilling fluids also may fracture the formation, requiring a drilling shut down in order to seal the fracture. Damage to a reservoir is particularly harmful if it occurs while drilling through the "payzone," or the zone believed to hold recoverable oil or gas.

Therefore, after a section of the wellbore has been drilled, drilling operations are stayed or ceased to seal the wellbore using a string of pipe such as casing or a liner in the well bore. The stops are commonly referred to as "casing points". At a casing point, a sealing composition such as hydraulic cement slurry is pumped into the annular space between the walls of the well bore and the exterior of the string of pipe disposed therein. The cement slurry is permitted to set in the annular space thereby forming an annular sheath of hardened substantially impermeable cement therein. The cement sheath physically supports and positions the pipe in the well bore and bonds the pipe to the walls of the well bore whereby the undesirable migration of fluids between zones or formations penetrated by the well bore is prevented. This well-established technique has several disadvantages, including a reduction in the well diameter after each casing point and the high cost of the casing itself.

Thus, there is a continuing need for improved methods and sealing compositions for sealing subterranean zones through which fluids undesirably flow into or out of the wellbores penetrating the zones and for simultaneously increasing the mechanical strengths of the wellbore.

PRIOR ART

In addition to the above-mentioned practice of casing and liner completion, it is known to consolidate formations with a fluid containing polymerizable or hardening materials, such as epoxides, resins or isocyanates in combination with diols. Those methods are described for example in the U.S. Pat. Nos. 6,012,524, 5,911,282, 5,242,021, 5,201,612, 4,965,292, 4,761,099, 4,715,746, 4,703,800, 4,137,971, or 3,941,191. In the recent International Patent Application WO 99/31353 there are described various compositions to stabilize clay formations through in-situ polymerization that significantly changes the resistance of the clay to swelling and dispersion on contact with water.

It is further known to apply rubber and latex based materials for remedial operations, such as U.S. Pat. Nos. 4,649,998 and 5,159,980. These techniques usally assume the existence of drilled wellbore and are applied locally to treat defects in the casing or cement. Or the treatment is applied to weakly consolidated sand formations, i.e. in highly porous formations.

In view of the above, it is an object of the invention to provide a novel method of stabilizing subterranean formations surrounding a borehole, particularly clayey or shale formations.

SUMMARY OF THE INVENTION

In accordance with the present invention there is provided a flexible lining to the wellbore. The lining material is designed to be more flexible and less permeable than the formation so that when the wellbore pressure exceeds the pore pressure the lining deforms more than the rock and remains in compression. The rock then provides mechanical support to the lining material, which therefore does not need a high (tensile) strength.

The desirable property of the lining material is met when its shear modulus $G_L$ is smaller than the shear modulus of the formation rock $G_R$. It is even more advantageous to have the ratio $G_L/G_R$ limited by the Poisson's ratio $\nu$ of the lining.

In a preferred embodiment, the lining material has a reduced permeability compared with the surrounding formation. Said formation being clayey implies that the lining is essentially impermeable.

According to a further preferred aspect of the invention, the lining is generated during or shortly after the drilling process. In other words, it is applied prior to casing and cementing and may extend the interval between casing points.

In a more specific embodiment, the lining material is generated through a chemical reaction of a precursor material that, preferably, can be added to the drilling fluid without impairing its other properties. In another specific embodiment the material is applied as a foil, preferably through an extrusion process or by pushing a liner from the surface or a combination of both.

When the fluid pressure in the wellbore exceeds the pressure that initiates hydraulic fracturing in the unlined formation, fractures will be initiated in the rock but they will be prevented from propagating by the lining material which stops fluid from entering the fracture and pressurizing the crack tip. We also note that the rock may enter plasticity, so the tensile crack may not even be initiated. The result of applying the lining will be an increase in the apparent fracture pressure of the rock formation, opening the mud window and allowing a greater length of well to be drilled before a conventional steel casing is set.

There are two main applications of the invention. Firstly, it is envisaged that a drilling mud formulation containing a combination of the specified compounds described below may be used to maintain the integrity of the wellbore during conventional drilling operations. Secondly, a fluid formulation containing a combination of the same compounds may be used for general remedial operations in the wellbore. Finally, the invention may be used to achieve the goal of "casingless drilling", that is to achieve with one and the same drilling and completion fluid the equivalent result of what is today obtained through a combination of drilling, casing and cementing operations. Or, the invention may reduce the number or casing points required to complete the drilling.

These and other features of the invention, preferred embodiments and variants thereof, and further advantages of the invention will become appreciated and understood by those skilled in the art from the detailed description following below.

EXAMPLE(S) FOR CARRYING OUT THE INVENTION

Figure 1:
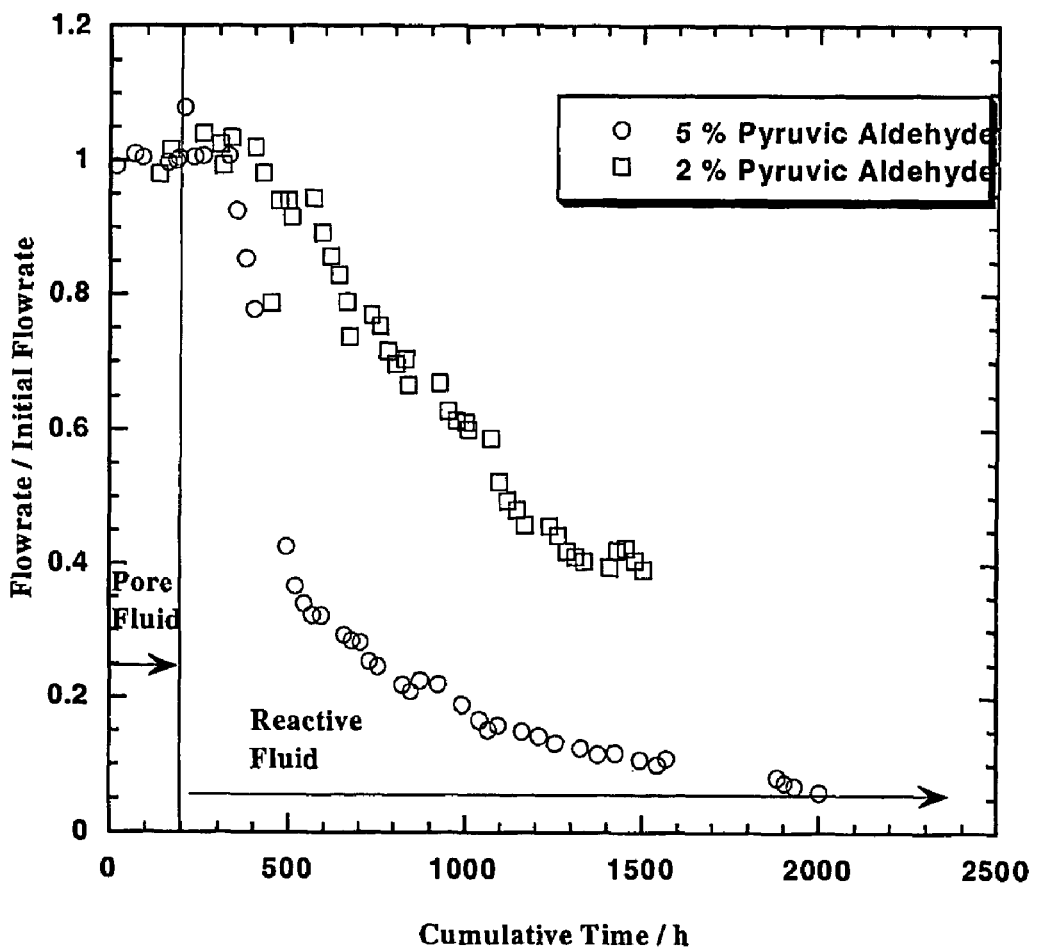
FIG. 1. shows the resulting change in permeability as a reaction in accordance with an example of the present invention progresses through a core sample.

The lining as envisaged by this invention could be either produced continuously during the drilling process or intermittently while drilling is suspended. Both preformed sleeving and material deposited downhole to produce the lining are appropriate. An advantage of the preformed sleeve is that the elastomer material properties can be optimized without the constraints imposed by an in situ production process. However, the lining formed downhole has the advantage of conforming to the shape of the wellbore, which may be irregular.

The solid mechanics of an impermeable liner in a wellbore can be summarized for the case of a thin liner (compared to the radius of the wellbore) by a stress concentration factor K defined as:

$$K = -\frac{G_l/G_r - v}{1 - v} \quad [1]$$

where $v$ is Poisson's ratio for the lining and $G_l$ and $G_r$ are the shear modulus of the lining material and the rock respectively. The lining is in tension if K is negative and the wellbore pressure exceeds the far field pressure. Therefore, the lining will always be in compression when $G_l/G_r < v$.

The structures of the chemicals compounds of potential use in the inventive process are shown in Table 1.

TABLE 1

Structures of Amine Aldehyde Chemicals.

| Compound | STRUCTURE |
| --- | --- |
| Formaldehyde | H₂C=O (H-CHO-H) |
| Glyoxal | OHC-CHO |
| Pyruvic Aldehyde | CH₃-CO-CHO |
| NAP | H₂N-CH₂CH₂CH₂-NH-CH₂CH₂-NH₂ |
| BNH2 | $CH_3CH(NH_2)CH_2$—$[OCH(CH_3)CH_2]_l$—$[OCH_2CH_2]_m$—$[OCH_2CH(CH_3)]_n$—$NH_2$ |
| 1,3 DA | $H_2N$-CH₂CH₂CH₂-$NH_2$ |
| 1,2 DA | CH₃-CH(NH₂)-CH₂-NH₂ |
| 3NH2 | $H_2N$-CH₂CH₂CH₂-N(H)-CH₂CH₂CH₂-$NH_2$ |
| DHB | 2,4-dihydroxybenzaldehyde (OHC-C₆H₃(OH)₂) |

Some trends can be discerned in the performance of the different chemical structures. Considering first the amines, branched compounds appear to perform better than the linear ones. Thus, 1,2 DA and 3NH2 are superior to 1,3DA and NAP respectively. Additionally, incorporating EO/PO groups as with BNH2, which are known to adsorb strongly on the clay and inhibit clay swelling, did not result in impressive permeability reductions. Comparing the aldehydes, the performance of the three small aldehydes was similar, with pyruvic aldehyde marginally exceeding the others.

The elasticity of the treated shale is a key parameter in the proposed wellbore lining technique, as the elastic modulus must be lower than that of the untreated shale for the lining to remain in compression as the pressure in the wellbore increases.

The mechanical properties of films treated with formaldehyde, glyoxal or pyruvic aldehyde and either 1,2 DA or 3NH2 are shown in Table 2. The 1,2DA pyruvic aldehyde treatment appears to increase both the tensile strength and the Young's and shear modulus compared to the untreated film. In all the other cases the treated films were more elastic than the untreated. Note that the 3NH2/pyruvic aldehyde has particularly good performance in that the tensile strength was increased in addition to a significant the reduction in the Young's and shear moduli.

TABLE 2

Mechanical Properties of Treated and Untreated Clay Films

| Clay Film Treatment | Tensile Stress (MPa) | Young's Modulus (GPa) | Shear Modulus (GPa) |
| --- | --- | --- | --- |
| Untreated samples | 7.8 | 2.7 | 9.1 |
| 1,2DA/Glyoxal | 12.2 | 2.2 | 7.3 |
| 1,2DA/Pyruvic Aldehyde | 13.8 | 3.9 | 13.1 |
| 3NH2/Formaldehyde | 3.0 | 0.94 | 3.1 |
| 3NH2/Glyoxal | 7.4 | 2.2 | 7.3 |
| 3NH2/Pyruvic Aldehyde | 15.9 | 2.2 | 7.2 |

In further experiments core samples were used to test the mechanical properties of shales modified in accordance with examples of the invention. Shale samples were prepared by cutting 1 inch diameter cores into 2 mm thick slices and polishing one face to a roughness of less than 1 $\mu$m using diamond paste. The prepared samples were tested in a concentric ring-on-ring jig, which was built for this purpose.

Results from this test are shown in Table 3, below. All cores have been drained at 10 MPa and exposed to fluids in a Hassler cell under a confining pressure of 8.0 MPa.

The core which has been treated with a BNH2/Glyoxal solution was used in the Hassler Cell experiment in which fluid was pumped through the core for an extended period of time until no further change in permeability occurred (see also FIG. 1 below). The Young's and shear modulus of the treated Oxford Clay were smaller in both cases than those of the untreated (pore fluid only) shale indicating the desired increase in flexibility, in contradiction of the results with the clay films. While the BNH2/Glyoxal did little to the tensile strength of the core while drastically reducing the moduli, the 3NH2 increased the tensile strength while marginally reducing the moduli compared to the core which had only seen pore fluid.

TABLE 1

Mechanical Properties of Treated and Untreated Shales

| Shale Sample | Strength (MPa) | Young's Modulus (GPa) | Shear Modulus (GPa) |
| --- | --- | --- | --- |
| Pore Fluid Only | 5.3 | 6.51 | 19.7 |
| BNH2/Glyoxal | 5.2 | 0.27 | 0.82 |
| 3NH2/Pyruvic Aldehyde | 7.9 | 5.75 | 17.4 |

Another aspect of the invention is the desired reduction in permeability afforded to the formation by the invention.

Experiments using a test cell with a thin clay film membrane show that the inherently low permeability of shale can be further reduced by a variety of chemical compositions. Results of those tests are shown in Table 4.

TABLE 4

Permeability Reduction in Clay Films Due to Polymerisation

| Chemistry | Permeability Reduced to |
| --- | --- |
| Glyoxal/NAP | 75% |
| Glyoxal/BNH2 | 46% |
| Glyoxal/1,3DA | 55% |
| Glyoxal/3NH2 | 42% |
| Glyoxal/1,2DA | 19% |
| Formaldehyde/BNH2 | 66% |
| Formaldehyde/3NH2 | 15% |
| Pyruvic Aldehyde/3NH2 | 10% |
| Pyruvic Acid/3NH2 | 36% |
| DHB/3NH2 | 233 |

In addition to the clay membrane cell experiments, two Hassler Cell tests were carried out on the 3NH2/Pyruvic aldehyde chemistry to confirm that the behaviour observed in the thin films could be reproduced in a shale, Oxford clay. The experiments consisted of confining a core of the shale in a rubber sleeve at a pressure of 8.0 MPa while fluid was pumped through the core at an inlet pressure of 7.5 MPa. The flow rate, normalised to the initial rate during flow of a synthetic pore fluid, is plotted for two concentrations of the pyruvic aldehyde FIG. 1. In both Hassler cell tests the concentration of 3NH2 was 5%.

The permeability has been reduced to 20% of the initial value, measured during flow of the synthetic pore fluid. Permeability reduction was considerably slower for the 2% pyruvic aldehyde which levelled off at around 40% of the initial value. These results are reasonably consistent with the clay membrane cells with the same reactants in which the permeability of the film was reduced to 60% and 10% for the low and high concentration of the aldehyde respectively. The Hassler cell with the 5% aldehyde shows reduction in the permeability of 6%. The improved performance with an increase in aldehyde concentration indicates that experiments at still higher concentration should be carried out.

A wellbore simulator (SWBS) has been used to demonstrate that the concept of the present is valid. This apparatus allows a rock core, in which a wellbore has already been drilled, to be exposed to a fluid under realistic downhole conditions. The rock used in the experiments was Oxford Clay. Cores 8 inches in diameter, 8 inches high and with a wellbore 1 inch in diameter along the core axis were prepared by an initial drainage period of 5 days at 10 MPa during which pore fluid was squeezed out of the core. The drained core was then placed in the wellbore simulator and its fracture pressure measured.

The overburden, confining and mud pressures can be controlled independently during an experiment. Firstly, the three pressures were stepped up to around 10 MPa while keeping any difference between the pressures small. Next the fluid filling the wellbore was circulated for a period of three days in the cases where the rock was exposed directly to the fluid. This was to allow for the development of any chemical interaction between the rock and the fluid. Then the position of the overburden piston was locked and the mud pressure was increased in steps of 0.5 MPa while the confining pressure was maintained at a constant value of 10 MPa. The mud pressure was increased until a path opened up to allow the mud to communicate with the confining boundary, at which point flow was observed out of the wellbore and into the confining fluid space; usually coincident with a pressure spike in the confining transducer. Once this event occurred, the mud pressure was reduced to match the overburden and confining once more and then all three were reduced to ambient in step so that no further damage to the rock took place during depressurization. At the end of a test the rock was removed and dissected to establish the mode of failure and the invasion of chemicals into the matrix.

Table 5 summarizes the results obtained for three mud systems and two flexible lining techniques. The water based mud systems were formulated with Xanthan gum for viscosity control and FLRXL fluid loss control and three different shale stabilizers: potassium chloride, potassium chloride+sodium silicate and potassium chloride+sodium silicate+polyglycol. For all three mud systems the rock fractured at pressures in a narrow band between 15.6 and 16.5 MPa.

TABLE 5

Initial wellbore simulator results

| Mud | Lining | Failure MPa | Comment |
|---|---|---|---|
| KCl/Polymer | None | 16.0–16.5 | B154 |
| Silicate | None | 15.7–16.0 | B155 |
| Silicate + Glycol | None | 15.6–16.0 | B153 |
| Water | Silicone Rubber | 19.2–19.6 | B157 End Effect |
| Water | Rubber Sleve | 21.1–21.7 | B159 O Ring Failed |

The test with a silicone rubber lining was carried out as follows. The core was prepared by draining at 10 MPa as previously described, however, before it was placed in the wellbore simulator the wellbore and the top and bottom surfaces of the core (but not the outer boundary) were coated with a layer of flowable silicone rubber (RS Components) to a thickness of 1 to 3 mm. The rubber was allowed to cure and then the coated core was tested to fracture with water filling the wellbore. The lining failed at a significantly increased pressure of between 19.2 and 19.6 MPa. The failure was caused by an end effect as the rupture occurred where the lining passed between the rock and the overburden piston and the true increase in fracture pressure for an infinite, smooth wellbore would have been even higher.

In the final test the core was lined with a preformed tube of fluorocarbon elastomer (Adpol, UK) of 0.8 mm thickness. The tube was sealed to the metal end platens that confine the top and bottom of the core and then the fracturing test was carried out as described above. With this lining the pressure limit of one of the seals in the wellbore simulator piston failed at around 21.7 MPa, at which time the lining still had not ruptured.

The last two test clearly demonstrate the large increases in fracture pressure possible by the application of a flexible, impermeable lining to the wellbore. The pressure at which the unsupported liners would have burst can be estimated by assuming that they behave as an elastic hollow cylinder. The burst pressure, $P_b$, is then given by $$P_b = \frac{r_e^2 - r_i^2}{r_e^2 + r_i^2}\sigma_t \quad [2]$$

where $\sigma_t$ is the tensile strength of the material and $r_e$ and $r_i$ are the external and internal radius of the cylinder respectively. For the silicone rubber, which had a tensile strength of 1.0 MPa, at a uniform thickness of 2 mm the burst pressure would have been 0.2 MPa when unsupported compared to the actual overbalance of 9.6 MPa at failure. For the preformed elastomer tubing with a tensile strength of 15 MPa the burst pressure would have been 1 MPa when unsupported by the rock compared to the maximum measured overbalance of almost 12 MPa.

Figure 2:
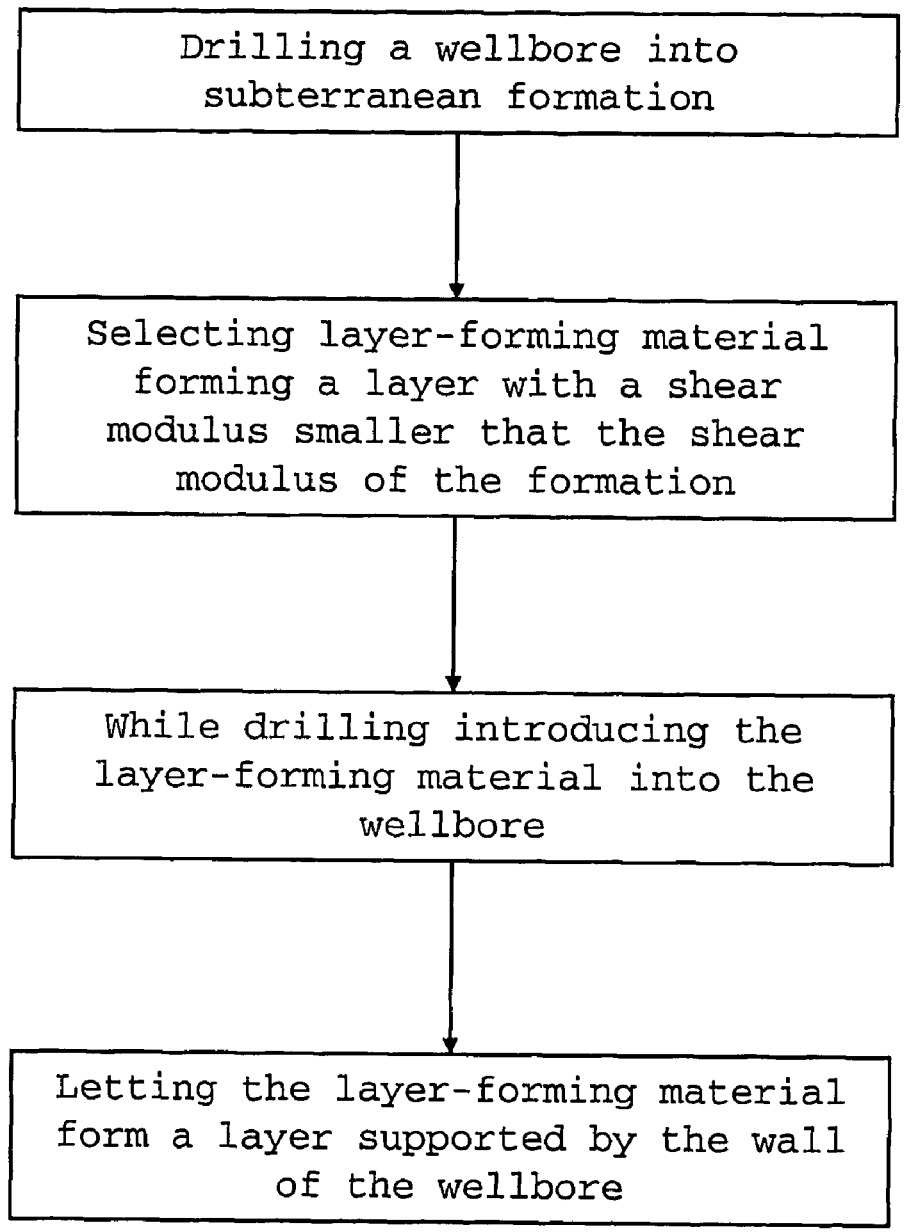
FIG. 2. is a flow chart illustrating major steps of a method in accordance with the present invention.

In FIG. 2, the main steps of the present invention are summarized as flow chart.

What is claimed is:

1. A method of stabilizing a wall of a wellbore penetrating a subterranean formation, said method comprising the steps of:
    (a) introducing a layer-forming material into said wellbore during the drilling process;
    (b) letting said material form a layer supported by said wall; and
    (c) selecting said material such that the ratio of the layer's shear modulus $G_l$ over the formations shear modulus $G_r$ is smaller than the Poisson's ratio $v$ of the layer material.

2. The method of claim 1, using the layer to reduce a stress concentration factor of the wall to less than zero.

3. The method of claim 1, wherein the material forms the layer through a chemical reaction within the wellbore.

4. The method of claim 3, wherein the material a mixture of pyruvic aldehyde and a triamine.

5. The method of claim 1, wherein the material is during a drilling operation continuously supplied from a surface location.

6. The method of claim 1, wherein the first reactant is a diamine or a dihydric alcohol and the second reactant comprises at least one carbonyl group.

7. The method of claim 1, wherein the material is selected such that the layer has a reduced permeability compared to the formation permeability.

8. A method of drilling a wellbore into a potentially hydrocarbon bearing formation comprising the steps of
    (a) drilling part of said wellbore
    (b) introducing during said drilling steps a layer-forming material into said wellbore;
    (c) letting said material form a layer supported by said wall; and
    (d) selecting said material such that the ratio of the layer's shear modulus $G_l$ over the formations shear modulus $G_r$ is smaller than the Poisson's ratio $v$ of the layer material.

* * * * *